(12) United States Patent
Sano et al.

(10) Patent No.: US 8,721,948 B2
(45) Date of Patent: May 13, 2014

(54) PROCESS FOR PRODUCING CROSSLINKED FLUORORUBBER

(75) Inventors: Hiroyuki Sano, Fujisawa (JP); Hiroki Matsumoto, Fujisawa (JP)

(73) Assignee: NOK Corporation, Tokyo (JP)

( * ) Notice: Subject to any disclaimer, the term of this patent is extended or adjusted under 35 U.S.C. 154(b) by 755 days.

(21) Appl. No.: 12/160,427

(22) PCT Filed: Oct. 16, 2006

(86) PCT No.: PCT/JP2006/320585
§ 371 (c)(1),
(2), (4) Date: Jul. 9, 2008

(87) PCT Pub. No.: WO2007/080681
PCT Pub. Date: Jul. 19, 2007

(65) Prior Publication Data
US 2011/0049752 A1    Mar. 3, 2011

(30) Foreign Application Priority Data
Jan. 11, 2006   (JP) .................................. 2006-004269

(51) Int. Cl.
*B29C 71/02*   (2006.01)
(52) U.S. Cl.
USPC ...... 264/234; 264/129; 264/134; 264/211.12; 264/232; 264/236; 264/331.14; 264/343; 264/347; 264/602
(58) Field of Classification Search
USPC ................. 264/236, 331.14, 347, 234, 343, 264/211.12, 232, 602, 129, 134
See application file for complete search history.

(56) References Cited

U.S. PATENT DOCUMENTS 4,981,912 A * 1/1991 Kurihara .................... 525/326.3
2006/0217491 A1 * 9/2006 Higashira et al. .......... 525/326.3

FOREIGN PATENT DOCUMENTS

| JP | 2003268349 A | * | 9/2003 |
| JP | 2004037094 | | 2/2005 |
| WO | 2004094479 | | 11/2004 |

OTHER PUBLICATIONS

JPO English machne translation of JP 2003-268349, retrieved Feb. 8, 2011.*

* cited by examiner

*Primary Examiner* — Timothy Kennedy
(74) *Attorney, Agent, or Firm* — K. David Crockett, Esq.; Niky Economy Syrengelas, Esq.; Crockett & Crockett, PC

(57) ABSTRACT

[Problem]To provide a method for producing a polyol-crosslinking, crosslinked fluororubber product which exhibits low tack properties and significantly increased rubber hardness.
[Means for Solving the problem] The method comprises pressurizing, heating, and vulcanizing a fluororubber composition to mold a vulcanized product; the fluororubber composition comprising a polyol-crosslinkable fluororubber, a crosslinking accelerator including a quarternary phosphonium salt or a quarternary ammonium salt, and a polyol crosslinking agent, the weight ratio X of the crosslinking accelerator to the polyol crosslinking agent (crosslinking accelerator/polyol crosslinking agent) being from 0.90 to 3.00 for a quarternary phosphonium salt, and being from 0.4 to 0.6 for a quarternary ammonium salt; applying a treatment solution containing the polyol crosslinking agent and the crosslinking accelerator dissohttp://reedman/Manuals/Text_Manual/Section_03.htm - 3.11ved in a solvent to a surface of the vulcanized product; and heat-treating the resulting vulcanized product at a temperature ranging from 200 to 300° C. for 1 to 20 hours.

3 Claims, 4 Drawing Sheets

US 8,721,948 B2

PROCESS FOR PRODUCING CROSSLINKED FLUORORUBBER

TECHNICAL FIELD

The present invention relates to a method for producing crosslinked fluororubber products used as head controllers (stoppers of the magnet holder type and the like) of hard disk drives (HDD), etc.; and more particularly, to a method for producing a crosslinked fluororubber product with significantly increased hardness and significantly lowered tackiness.

BACKGROUND ART

Rubbers, elastomers, resins, and metals have conventionally been used to position head arms of hard disk drives (HDD), or as buffer components. In recent years, rubbers, and especially fluororubber, have increasingly been used in consideration of designs in which the buffering effect is important, the need to reduce noise, etc.

Although conventional fluororubber is a material with excellent shock absorbing properties and cleanliness, it has problems concerning its non-tack properties. For example, when the conventional fluororubber is used as a stopper of the storage of a hard disk drive (HDD), a malfunction due to the tackiness between the stopper and arm becomes a problem.

Patent Document 1 discloses a method for making a rubber surface non-tack by impregnating the surface of a rubber with a solution of a crosslinking agent and a crosslinking accelerator for fluororubber, and crosslinking the rubber again. This technique, however, poses problems such as environmental damage due to a solvent treatment using an excessive amount of solvent, and when a solvent is used to control the penetration of the solution, the performance of the products may vary, sometimes causing operating failures of HDD.

The present inventors have previously proposed a technique of achieving non-tackiness (Patent Document 2) by conducting research from a new perspective, that is, an approach based on formulations without depending on the subsequent processing. More specifically, Patent Document 2 discloses a technique of making a rubber surface non-tack, wherein, in a fluororubber composition comprising a polyol-crosslinkable fluororubber, a crosslinking accelerator composed of a quarternary phosphonium salt, and a polyol crosslinking agent, the ratio of the crosslinking accelerator, i.e., a quarternary phosphonium salt, to the crosslinking agent (crosslinking accelerator/crosslinking agent) blended in the polyol-crosslinkable fluororubber composition is adjusted to at least 0.9 and not more than 5, so as to increase the ratio of the added crosslinking accelerator as compared with conventional fluororubber compositions.

Patent Document 1: JP,04-037094,B
Patent Document 2: WO 2004/094479

DISCLOSURE OF THE INVENTION

Problem to be Solved by the Invention

The technique of Patent Document 2 achieves an tackiness increase rate of 10% or lower, which is measured by subjecting a rubber to a humidity change at temperatures ranging from 60 to 23° C. (the evaluation method I), and therefore provides excellent low tack properties.

In recent years, low tack properties have been demanded in crosslinked fluororubber products such that the tackiness increase rate (the evaluation method II), which is measured after the crosslinked fluororubber products are repeatedly subjected to an environmental change from a high temperature (80° C.) to a low temperature (0° C.), is 10% or lower. In this respect, the technique of Patent Document 2 still had room to be improved in terms of the low tack properties according to the evaluation method II.

An object of the present invention is to provide a method for producing a polyol-crosslinking, crosslinked fluororubber product, which exhibits low tack properties according to the evaluation method II, and exhibits a significantly increased hardness.

Other objects of the invention will become apparent from the following description.

Means for Solving the Problems

The above-described object can be solved by the following inventions.

The invention according to claim 1 resides in a method for producing a crosslinked fluororubber product, comprising pressurizing, heating, and vulcanizing a fluororubber composition to mold a vulcanized product; the fluororubber composition comprising a polyol-crosslinkable fluororubber, a crosslinking accelerator including a quarternary phosphonium salt, and a polyol crosslinking agent, the weight ratio X of the crosslinking accelerator to the polyol crosslinking agent (crosslinking accelerator/polyol crosslinking agent) being from 0.90 to 3.00; applying a treatment solution containing the polyol crosslinking agent and the crosslinking accelerator dissolved in a solvent to a surface of the vulcanized product; and heat-treating the resulting vulcanized product at a temperature ranging from 200 to 300° C. for 1 to 20 hours.

The invention according to claim 2 resides in a method for producing a crosslinked fluororubber product, comprising pressurizing, heating, and vulcanizing a fluororubber composition to mold a vulcanized product; the fluororubber composition comprising a polyol-crosslinkable fluororubber, a crosslinking accelerator including a quarternary ammonium salt, and a polyol crosslinking agent, the weight ratio X of the crosslinking accelerator to the polyol crosslinking agent (crosslinking accelerator/polyol crosslinking agent) being from 0.4 to 0.6; applying a treatment solution containing the polyol crosslinking agent and the crosslinking accelerator dissolved in a solvent to a surface of the vulcanized product; and heat-treating the resulting vulcanized product at a temperature ranging from 200 to 300° C. for 1 to 20 hours.

The invention according to claim 3 resides in the method for producing a crosslinked fluororubber product recited in claim 1 or 2, wherein the treatment solution contains 5 to 20 wt % of the polyol crosslinking agent (based on the total amount) and 1 to 10 wt % of the crosslinking accelerator (based on the total amount).

Another invention resides in the method for producing a crosslinked fluororubber product disclosed above, wherein the coating thickness of the treatment solution is from 1 to 15 µm.

Another invention resides in the method for producing a crosslinked fluororubber product disclosed above, wherein a magnet tackiness increase rate according to an evaluation method II is 10% or lower.

Another invention resides in the method for producing a crosslinked fluororubber product disclosed above, which produces a polyol-crosslinking, crosslinked fluororubber product for use as a magnet holder-type stopper in an HDD.

Effects of the Invention

The present invention provides a method for producing a polyol-crosslinking, crosslinked fluororubber product, which exhibits low tack properties according to the evaluation method II, and exhibits a significantly increased hardness.

BEST MODE FOR CARRYING OUT THE INVENTION

[Fluororubber Composition]

Figure 1:
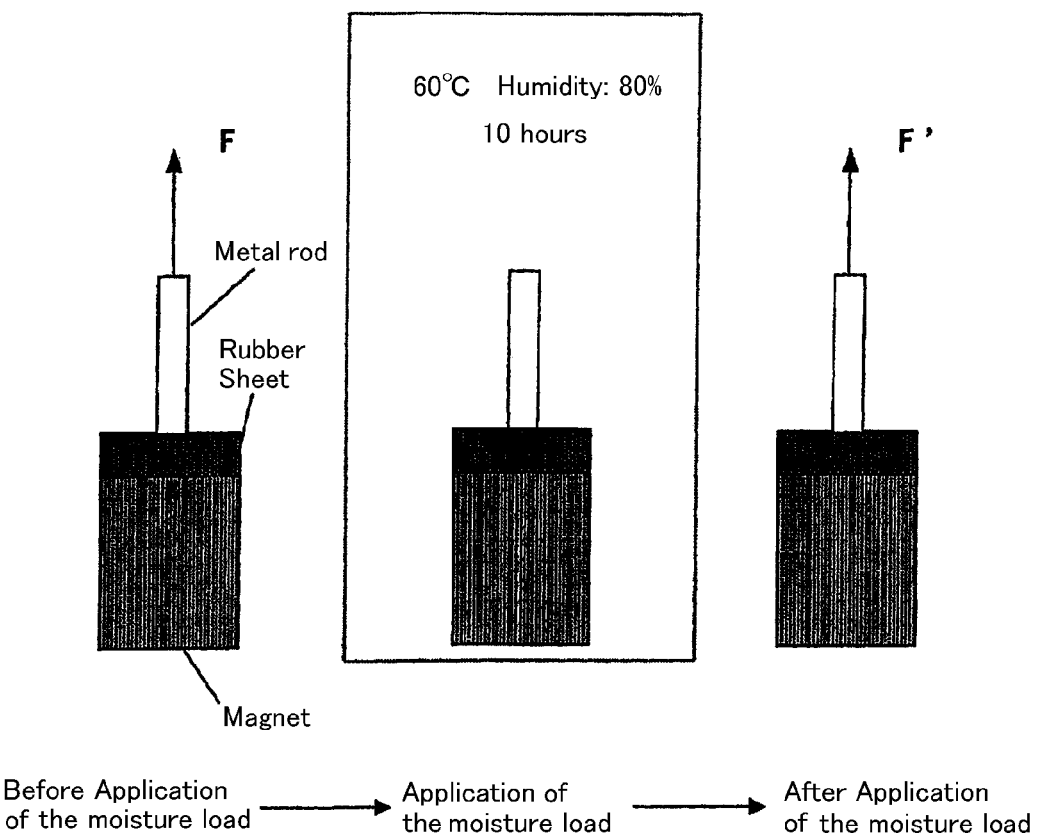
FIG. 1 is a diagram showing an apparatus for measuring the tackiness increase rate, and the measuring method thereof.

The fluororubber composition of the invention comprises at least a polyol-crosslinkable fluororubber, a crosslinking accelerator including a quarternary ammonium salt or a quarternary phosphonium salt, and a polyol crosslinking agent.

<Polyol-Crosslinkable Fluororubber>

A polymer or copolymer of one or more fluorine-containing olefins can be used as a polyol-crosslinkable fluororubber (a polyol-crosslinking fluororubber).

Specific examples of fluorine-containing olefins include vinylidene fluoride, hexafluoropropylene, pentafluoropropylene, trifluoroethylene, trifluorochloroethylene, tetrafluoroethylene, vinyl fluoride, perfluoroacrylic esters, perfluoroalkyl acrylates, perfluoromethyl vinyl ether, perfluoropropyl vinyl ether, and the like.

These fluorine-containing olefins may be used alone or in combination.

Preferable examples of the polyol-crosslinking fluororubber include vinylidene fluoride-hexafluoropropylene binary copolymer (abbreviation: VDF-HFP), tetrafluoroethylene-propylene binary copolymer (abbreviation: TFE-P), vinylidene fluoride-hexafluoropropylene-tetrafluoroethylene ternary copolymer (abbreviation: VDF-HFP-TFE), and the like, which are obtainable as commercially available products.

<Polyol Crosslinking Agent>

A bisphenol is preferable as a polyol crosslinking agent. Specific examples of bisphenols include polyhydroxy aromatic compounds such as 2,2-bis(4-hydroxyphenyl)propane [bisphenol A], 2,2-bis(4-hydroxyphenyl)perfluoropropane [bisphenol AF], bis(4-hydroxyphenyl)sulfone [bisphenol S], bisphenol A-bis(diphenyl phosphate), 4,4'-dihydroxydiphenyl, 4,4'-dihydroxydiphenylmethane, 2,2-bis(4-hydroxyphenyl)butane, and the like; among which bisphenol A, bisphenol AF, and the like are preferably used. They may be in the form of alkali metal salts or alkaline earth metal salts.

A commercially available master batch containing a raw rubber and a polyol crosslinking agent may also be used as a polyol crosslinking agent. Examples of commercially available master batches include CURATIVE VC #30 (manufactured by DuPont Dow Elastomers, containing 50 wt % of a crosslinking agent [bisphenol AF]) and the like. These crosslinking agents may be used alone or in combination.

<Crosslinking Accelerator>

As the quarternary ammonium salt for use as a crosslinking accelerator in the invention, a compound can be used represented by general formula (1) below (hereinafter referred to as the "quarternary ammonium salt of the invention"):

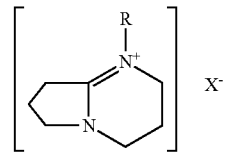

[Chemical Formula 1]

wherein R represents a $C_1$-$C_{24}$ alkyl group or a $C_7$-$C_{20}$ aralkyl group; and $X^-$ represents a tetrafluoroborate group or a hexafluorophosphate group.

A compound wherein R is a benzyl group is preferable as the quarternary ammonium salt of the invention such as, for example, 5-benzyl-1,5-diazabicyclo[4.3.0]-5-nonenium tetrafluoroborate (abbreviation: DBN-F), hexafluorophosphate (abbreviation: DBN-P), or the like.

The tetrafluoroborate and hexafluorophosphate have melting points of about 80° C. and 100° C., respectively, and exhibit excellent dispersibility because they easily melt during heat kneading (100° C.) using a roll, a kneader, a Banbury mixer, or the like.

A commercially available master batch containing a raw rubber and a quarternary ammonium salt may also be used as the quarternary ammonium salt of the invention.

The quarternary phosphonium salt for use as a crosslinking accelerator in the invention is represented by general formula $(R_1R_2R_3R_4P)^+X^-$, wherein $R_1$ to $R_4$ are each a $C_1$-$C_{25}$ alkyl, alkoxy, aryl, alkylaryl, aralkyl, or polyoxyalkylene group; alternatively, two or three of $R_1$ to $R_4$ may form a heterocyclic ring together with P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_2^{2-}$, or the like.

Specific examples of quarternary phosphonium salts include tetraphenylphosphonium chloride, triphenylbenzylphosphonium chloride, triphenylbenzylphosphonium bromide, triphenylmethoxymethylphosphonium chloride, triphenylmethylcarbonyl methylphosphonium chloride, triphenylethoxycarbonyl methylphosphonium chloride, trioctylbenzyl phosphonium chloride, trioctylmethyl phosphonium bromide, trioctylethyl phosphonium acetate, trioctylethyl phosphonium dimethylphosphate, tetraoctyl phosphonium chloride, cetyldimethylbenzyl phosphonium chloride, and the like.

A commercially available masterbatch containing a raw rubber and a crosslinking accelerator may also be used as a quarternary phosphonium salt.

<Other Blending Components>

In the invention, components generally used in the rubber industry may be added, as required, as other blending components within a range such that the effects of the crosslinking agent and crosslinking accelerator used in the invention are not impaired. Examples of other blending components include reinforcing agents such as carbon black and carbon fiber; fillers such as hydrotalcite ($Mg_6Al_2(OH)_{16}CO_3$), calcium carbonate, magnesium carbonate, aluminium hydroxide, calcium hydroxide, magnesium hydroxide, aluminium silicate, magnesium silicate, calcium silicate, potassium titanate, titanium oxide, magnesium oxide, barium sulfate, aluminum borate, glass fiber, aramid fiber, and the like; processing aids such as waxes, metallic soaps, and the like; acid acceptors such as calcium hydroxide, zinc oxide, and the like; antioxidants; thermoplastic resins; etc.

In the invention, conductive additives may also be blended. Examples of conductive additives usable in the invention include acetylene black, Ketjenblack, and the like, among which acetylene black and Ketjenblack are preferable. Acetylene black and Ketjenblack can also be used together.

<Blending Ratio>

In the invention, when the crosslinking accelerator is a quarternary phosphonium salt, the weight ratio X of the crosslinking accelerator to the polyol crosslinking agent (crosslinking accelerator/polyol crosslinking agent) is in a range of 0.90 to 3.00, and preferably in a range of 0.90 to 2.00.

In the invention, the ratio of the crosslinking accelerator added is increased to obtain satisfactory non-tack properties. Moreover, this is combined with the surface treatment described below, so as to reduce the tackiness increase rate according to not only the evaluation method I but also the evaluation method II, thereby reducing variations in the tack properties.

In the invention, when the crosslinking accelerator is a quarternary ammonium salt, the weight ratio X of the crosslinking accelerator to the polyol crosslinking agent (crosslinking accelerator/polyol crosslinking agent) is in a range of 0.40 to 0.6.

The amount of the crosslinking accelerator (a quarternary ammonium salt or a quarternary phosphonium salt) used is preferably in a range of 0.95 to 20 parts by weight, and more preferably in a range of 1.0 to 10 parts by weight, per 100 parts by weight of the polyol-crosslinkable fluororubber.

The amount of the polyol crosslinking agent (preferably a bisphenol) is typically in a range of 0.4 to 20 parts by weight, and more preferably in a range of 1 to 10 parts by weight, per 100 parts by weight of the polyol-crosslinkable fluororubber.

<Preparation>

Examples of methods for preparing the polyol-crosslinkable fluororubber composition according to the invention include a method in which predetermined amounts of the above-described components are kneaded using a closed kneader such as an intermix, a kneader, or a Banbury mixer, or using a general kneader for rubber such as an open roll mill; a method in which each component is dissolved in a solvent or the like and dispersed with a stirrer or the like; and so forth.

[Method for Producing Crosslinked Fluororubber Product]

<Molding of a Vulcanized Product by Primary Vulcanization (Crosslinking)>

The fluororubber composition prepared as described above is pressurized, heated and vulcanized to mold a vulcanized product.

Specifically, the fluororubber composition prepared as described above is crosslinked (vulcanized) by heating (primary vulcanization) typically at a temperature of 140 to 230° C. for about 1 to 120 minutes, using an injection molding machine, a compression molding machine, a vulcanizing press, an oven, or the like, thereby molding a vulcanized product.

The primary vulcanization is a process of crosslinking the fluororubber composition to such a degree that its shape can be maintained to form (preform) a certain shape. In the case of a complicated shape, the composition is preferably molded with a mold, and primary vulcanization can also be performed in an air oven or the like.

In the invention, when a fluororubber composition is kneaded and then the resulting processed product is compression molded, the composition after kneading may typically be compression molded by (a) cooling back to room temperature once and heating again, or (b) heating continuously after kneading. In the compression step using a compression molding machine, the method (a) above is typically employed.

In the manufacture of fluororubber molded articles such as, for example, rubber hoses, the fluororubber composition after kneading can be extruded into a tubular shape and then directly vulcanized in an oven. In this case, the method (b) is employed.

If the fluororubber composition is preformed into a certain shape before vulcanization, a low-tackiness article can be obtained by either of the method (a) or (b).

<Application of a Surface Treatment Solution>

A treatment solution containing the above-mentioned polyol crosslinking agent and crosslinking accelerator dissolved in a solvent is then applied to a surface of the vulcanized product.

Any of the above-mentioned polyol crosslinking agents can be used as the polyol crosslinking agent for use in the treatment solution to crosslink the polyol-crosslinkable fluororubber.

Moreover, any of the above-mentioned quarternary ammonium salts or quarternary phosphonium salts can be used as the crosslinking accelerator composed of a quarternary ammonium salt or a quarternary phosphonium salt. As required, a crosslinking accelerator aid can be added selected from sulfones such as dimethylsulfone, p,p-dichlorodiphenylsulfone, and the like; and sulfoxides such as dimethyl sulfoxide, diethyl sulfoxide, and the like.

As a solvent, one of organic solvents such as acetone, methanol, isopropyl alcohol, and the like may be used, or two or more of them may be used in combination.

The surface treatment solution for the vulcanized rubber preferably contains 5 to 20 wt % of the polyol crosslinking agent (based on the total amount) and 1 to 10 wt % of the crosslinking accelerator (based on the total amount).

Any application method such as spraying, brushing, ink-jet or the like may be used as long as an equal coating thickness can be formed. Unlike the method in which a vulcanized product is entirely immersed, as described in JP,04-037094,B, these application methods apply the solution partially to a rubber, and therefore eliminate problems such as environmental damage due to excessive use of solvent, and also eliminate variations in the product performance.

The coating thickness of the treatment solution is preferably in a range of 1 to 15 μm.

<Heat Treatment>

A heat treatment is performed after the coating has been formed on the surface of the vulcanized product using a surface treatment solution, as described above.

In the invention, a heat treatment is performed at a temperature ranging from 200 to 300° C. for 1 to 20 hours.

Although the heat treatment method of the invention is the same as usual secondary vulcanization, unless the above-described vulcanized product with a coating formed thereon is used, a crosslinked fluororubber product according to the invention, which has predetermined low tack properties (satisfying the evaluation method II) and increased hardness, cannot be obtained even if usual secondary vulcanization is performed.

In the invention, low tack properties according to the evaluation method I can be achieved by the rubber formulation. Furthermore, two layers of low-tackiness layers are formed by forming the coating of a surface treatment solution, as described above. More importantly, the coating is formed only on the portion that requires low tack properties, without changing the properties, especially hardness, of the other regions of the crosslinked fluororubber product itself.

In addition, the crosslinked fluororubber product possesses sufficient strength because of the crosslinking reaction of the fluororubber and the low tack layer, and therefore, does not suffer from the removal of the low-tackiness layer and the like as with usual coatings.

In terms of a change in its tack properties, the crosslinked fluororubber product of the invention preferably satisfies not only the following evaluation method I, but also has a magnet tackiness increase rate of 10% or lower, as measured by the evaluation method II.

(Evaluation Method I)

A sample rubber sheet with a thickness of 0.4 mm, a length of 3 mm, and a width of 3 mm is placed on a magnet (a permanent magnet, shape: a square with a thickness of 3.6 mm, a length of 3 mm, and a width of 3 mm) whose bottom is fixed as shown in FIG. 1. A metal rod (made of SPCC (a cold rolled steel plate), weight: 30 g, the shape of the portion contacting the rubber: a 3 mm×1 mm square rod) is placed on the sample rubber sheet, and an initial tackiness F between the rubber and metal rod is measured at 23° C. and a humidity of 50%.

The metal rod is then placed on the sample rubber again, and a test unit including the magnet, sample rubber, and metal rod is allowed to stand still at 60° C. and at a humidity of 80% for 10 hours.

The test unit is subsequently placed back at 23° C. and at a humidity of 50%, and the tackiness F' after the application of the moisture load is measured. Using the measured values F, F', the tackiness increase rate (%) is determined in accordance with the following equation:

(Tackiness Increase Rate)=$100 \times (F'-F)/F$ (Evaluation Method II)

A sample rubber sheet with a thickness of 0.4 mm, a length of 3 mm, and a width of 3 mm is placed on a magnet (a permanent magnet, shape: a square with a thickness of 3.6 mm, a length of 3 mm, and a width of 3 mm) whose bottom is fixed as shown in FIG. 1. A metal rod (made of SPCC (a cold rolled steel plate), weight: 30 g, the shape of the portion contacting the rubber: a 3 mm×1 mm square rod) is placed on the sample rubber sheet, and an initial tackiness F between the rubber and metal rod is measured at 23° C. and a humidity of 50%.

The metal rod is then placed on the sample rubber again, and a test unit including the magnet, sample rubber, and metal rod is allowed to stand at 80° C. for 2 hours, and subsequently at 0° C. for 2 hours. The test unit is repeatedly subjected to 20 cycles of being allowed to stand under such a temperature change, and removed from the atmosphere at 0° C. after the final cycle. The tackiness F" is then measured, and using the measured values F, F", the tackiness increase rate (%) is determined in accordance with the following equation:

(Tackiness Increase Rate)=$100 \times (F''-F)/F$

EXAMPLES

The present invention is hereinafter described based on Examples; however, the invention is not limited by the Examples in any way.

Example 1

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$, (121° C.): 45) . . . 100 parts by weight (2) MT carbon:

("Huber N-990" manufactured by Huber, average particle diameter: 500 nm, specific surface area: 6 m²/g) . . . 25 parts by weight (3) Magnesium oxide:

("Kyowamag #150" manufactured by Kyowa Chemical Industry Co., Ltd.) . . . 3 parts by weight (4) Calcium hydroxide:

("CALDIC #2000" manufactured by Ohmi Chemical Industry, Ltd.) . . . 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) . . . 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) . . . 9.0 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

A surface treatment solution with the composition shown below was prepared.

(1) Bisphenol AF (crosslinking agent): ("CHEMINOX BAF" manufactured by Unimatec, Co., Ltd. (purity: 98% or higher) . . . 10% by weight (2) Quarternary phosphonium salt (crosslinking accelerator): benzyltriphenylphosphonium chloride . . . 2% by weight (3) Acetone/methanol (1/1) mixed solvent . . . 20% by weight The surface treatment solution was sprayed to the surface of the above-described vulcanized product. The coated vulcanized product was subsequently air-dried for 30 minutes or longer, and then pre-dried at 120° C. for 30 minutes.

The dried coating thickness was as shown in Table 1. Note that the coating thickness shown in Table 1 is a value obtained by measuring the thickness of a polyimide, which was treated in line with the vulcanized product, using a thickness tester. At the time, the thickness was adjusted to be 5 μm.

<Heat Treatment>

A heat treatment was then performed at 260° C. for 10 hours.

<Measurement>

The resulting heat-treated product was measured for its rubber hardness (measured both before and after the surface treatment) and tackiness increase rate, according to the following methods. The results are shown in Table 1.

Rubber Hardness

Rubber hardness was measured with a type-A durometer in accordance with JIS K6253. Typically, it is preferably from 40 to 95 (point), and more preferably from 60 to 90 (point).

Measurement of the Tackiness Increase Rate

Evaluation method I: the method as described above.

Evaluation method II: the method as described above.

Example 2

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) . . . 100 parts by weight (2) MT carbon:

("Huber N-990" manufactured by Huber, average particle diameter: 500 nm, specific surface area: 6 m²/g) ... 25 parts by weight (3) Magnesium oxide:

("Kyowamag #150" manufactured by Kyowa Chemical Industry Co., Ltd.) ... 3 parts by weight (4) Calcium hydroxide:

("CALDIC #2000" manufactured by Ohmi Chemical Industry, Ltd.) ... 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) ... 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) ... 9.0 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

A surface treatment solution with the composition shown below was prepared.

(1) Bisphenol AF (crosslinking agent): ("CHEMINOX BAF" manufactured by Unimatec, Co., Ltd. (purity: 98% or higher) ... 10% by weight (2) Quarternary phosphonium salt (crosslinking accelerator): benzyltriphenylphosphonium chloride ... 2% by weight (3) Acetone/methanol (1/1) mixed solvent ... 20% by weight The surface treatment solution was sprayed to the surface of the above-described vulcanized product. The coated vulcanized product was subsequently air-dried for 30 minutes or longer, and then pre-dried at 120° C. for 30 minutes.

The dried coating thickness was as shown in Table 1. Note that the coating thickness shown in Table 1 is a value obtained by measuring the thickness of a polyimide, which was treated in line with the vulcanized product, using a thickness tester. At the time, the thickness was adjusted to be 8 μm.

<Heat Treatment>

A heat treatment was then performed at 260° C. for 10 hours.

<Measurement>

The resulting heat-treated product was measured in the same manner as Example 1. The results are shown in Table 1.

Example 3

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) ... 100 parts by weight (2) MT carbon:

("Huber N-990" manufactured by Huber, average particle diameter: 500 nm, specific surface area: 6 m²/g) ... 25 parts by weight (3) Magnesium oxide:

("Kyowamag #150" manufactured by Kyowa Chemical Industry Co., Ltd.) ... 3 parts by weight (4) Calcium hydroxide:

("CALDIC #2000" manufactured by Ohmi Chemical Industry, Ltd.) ... 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) ... 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) ... 9.0 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

A surface treatment solution with the composition shown below was prepared.

(1) Bisphenol AF (crosslinking agent): ("CHEMINOX BAF" manufactured by Unimatec, Co., Ltd. (purity: 98% or higher) ... 10% by weight (2) Quarternary phosphonium salt (crosslinking accelerator): benzyltriphenylphosphonium chloride ... 2% by weight (3) Acetone/methanol (1/1) mixed solvent ... 20% by weight The surface treatment solution was sprayed to the surface of the above-described vulcanized product. The coated vulcanized product was subsequently air-dried for 30 minutes or longer, and then pre-dried at 120° C. for 30 minutes.

The dried coating thickness was as shown in Table 1. Note that the coating thickness shown in Table 1 is a value obtained by measuring the thickness of a polyimide, which was treated in line with the vulcanized product, using a thickness tester. At the time, the thickness was adjusted to be 12 μm.

<Heat Treatment>

A heat treatment was then performed at 260° C. for 10 hours.

<Measurement>

The resulting heat-treated product was measured in the same manner as Example 1. The results are shown in Table 1.

Comparative Example 1

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) ... 100 parts by weight (2) MT carbon:

("Huber N-990" manufactured by Huber, average particle diameter: 500 nm, specific surface area: 6 m²/g) ... 25 parts by weight (3) Magnesium oxide:

("Kyowamag #150" manufactured by Kyowa Chemical Industry Co., Ltd.) ... 3 parts by weight (4) Calcium hydroxide:

("CALDIC #2000" manufactured by Ohmi Chemical Industry, Ltd.) . . . 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) . . . 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) . . . 1.6 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

A surface treatment solution with the composition shown below was prepared.

(1) Bisphenol AF (crosslinking agent): ("CHEMINOX BAF" manufactured by Unimatec, Co., Ltd. (purity: 98% or higher) . . . 10% by weight (2) Quarternary phosphonium salt (crosslinking accelerator): benzyltriphenylphosphonium chloride . . . 2% by weight (3) Acetone/methanol (1/1) mixed solvent . . . 20% by weight The surface treatment solution was sprayed to the surface of the above-described vulcanized product. The coated vulcanized product was subsequently air-dried for 30 minutes or longer, and then pre-dried at 120° C. for 30 minutes.

The dried coating thickness was as shown in Table 1. Note that the coating thickness shown in Table 1 is a value obtained by measuring the thickness of a polyimide, which was treated in line with the vulcanized product, using a thickness tester. At the time, the thickness was adjusted to be 5 μm.

<Heat Treatment>

A heat treatment was then performed at 260° C. for 10 hours.

<Measurement>

The resulting heat-treated product was measured in the same manner as Example 1. The results are shown in Table 1.

Comparative Example 2

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) . . . 100 parts by weight (2) MT carbon:

("Huber N-990" manufactured by Huber, average particle diameter: 500 nm, specific surface area: 6 m$^2$/g) . . . 25 parts by weight (3) Magnesium oxide:

("Kyowamag #150" manufactured by Kyowa Chemical Industry Co., Ltd.) . . . 3 parts by weight (4) Calcium hydroxide:

("CALDIC #2000" manufactured by Ohmi Chemical Industry, Ltd.) . . . 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) . . . 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) . . . 1.6 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

A surface treatment solution with the composition shown below was prepared.

(1) Bisphenol AF (crosslinking agent): ("CHEMINOX BAF" manufactured by Unimatec, Co., Ltd. (purity: 98% or higher) . . . 10% by weight (2) Quarternary phosphonium salt (crosslinking accelerator): benzyltriphenylphosphonium chloride . . . 2% by weight (3) Acetone/methanol (1/1) mixed solvent . . . 20% by weight The surface treatment solution was sprayed to the surface of the above-described vulcanized product. The coated vulcanized product was subsequently air-dried for 30 minutes or longer, and then pre-dried at 120° C. for 30 minutes.

The dried coating thickness was as shown in Table 1. Note that the coating thickness shown in Table 1 is a value obtained by measuring the thickness of a polyimide, which was treated in line with the vulcanized product, using a thickness tester. At the time, the thickness was adjusted to be 8 μm.

<Heat Treatment>

A heat treatment was then performed at 260° C. for 10 hours.

<Measurement>

The resulting heat-treated product was measured in the same manner as Example 1. The results are shown in Table 1.

Comparative Example 3

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) . . . 100 parts by weight (2) MT carbon:

("Huber N-990" manufactured by Huber, average particle diameter: 500 nm, specific surface area: 6 m$^2$/g) . . . 25 parts by weight (3) Magnesium oxide:

("Kyowamag #150" manufactured by Kyowa Chemical Industry Co., Ltd.) . . . 3 parts by weight (4) Calcium hydroxide:

("CALDIC #2000" manufactured by Ohmi Chemical Industry, Ltd.) . . . 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) . . . 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) . . . 1.6 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

A surface treatment solution with the composition shown below was prepared.

(1) Bisphenol AF (crosslinking agent): ("CHEMINOX BAF" manufactured by Unimatec, Co., Ltd. (purity: 98% or higher) . . . 10% by weight (2) Quarternary phosphonium salt (crosslinking accelerator): benzyltriphenylphosphonium chloride . . . 2% by weight (3) Acetone/methanol (1/1) mixed solvent . . . 20% by weight The surface treatment solution was sprayed to the surface of the above-described vulcanized product. The coated vulcanized product was subsequently air-dried for 30 minutes or longer, and then pre-dried at 120° C. for 30 minutes.

The dried coating thickness was as shown in Table 1. Note that the coating thickness shown in Table 1 is a value obtained by measuring the thickness of a polyimide, which was treated in line with the vulcanized product, using a thickness tester. At the time, the thickness was adjusted to be 12 μm.

<Heat Treatment>

A heat treatment was then performed at 260° C. for 10 hours.

<Measurement>

The resulting heat-treated product was measured in the same manner as Example 1. The results are shown in Table 1.

Comparative Example 4

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) . . . 100 parts by weight (2) MT carbon:

("Huber N-990" manufactured by Huber, average particle diameter: 500 nm, specific surface area: 6 $m^2/g$) . . . 25 parts by weight (3) Magnesium oxide:

("Kyowamag #150" manufactured by Kyowa Chemical Industry Co., Ltd.) . . . 3 parts by weight (4) Calcium hydroxide:

("CALDIC #2000" manufactured by Ohmi Chemical Industry, Ltd.) . . . 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) . . . 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) . . . 9.0 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

No surface treatment was performed.

<Heat Treatment>

A heat treatment was then performed at 260° C. for 10 hours.

<Measurement>

The resulting heat-treated product was measured in the same manner as Example 1. The results are shown in Table 1.

Comparative Example 5

<Blending Components and Amounts Thereof>

(1) Polyol-crosslinkable fluororubber:

("Viton A500" manufactured by DuPont Dow Elastomers; polyol-vulcanizing type, Mooney viscosity $ML_{1+10}$ (121° C.): 45) . . . 100 parts by weight (2) MT carbon:

("Huber N-990" manufactured by Huber, average particle diameter: 500 nm, specific surface area: 6 $m^2/g$) . . . 25 parts by weight (3) Magnesium oxide:

("Kyowamag #150" manufactured by Kyowa Chemical Industry Co., Ltd.) . . . 3 parts by weight (4) Calcium hydroxide:

("CALDIC #2000" manufactured by Ohmi Chemical Industry, Ltd.) . . . 3 parts by weight (5) Crosslinking agent: bisphenol AF (a masterbatch of 50 wt % of "CURATIVE VC #30" and 50 wt % of fluororubber "Viton E-45", manufactured by DuPont Dow Elastomers) . . . 4.5 parts by weight (note: thrown into a roll)

(6) Crosslinking accelerator: quarternary phosphonium salt (a masterbatch of 33 wt % of crosslinking accelerator "CURATIVE VC #20" and 67 wt % of fluororubber "Viton E-45", manufactured by DuPont Dow Elastomers) . . . 1.6 parts by weight (note: thrown into a roll)

<Preparation and Molding of a Vulcanized Product>

The above-listed components (except for the vulcanizing components) were thrown into a kneader and kneaded for 20 minutes, after which the vulcanizing components were thrown into an open roll mill, thereby preparing a composition.

The resulting composition was pressurized and vulcanized at 170° C. for 20 minutes to mold a vulcanized product.

<Preparation and Application of a Surface Treatment Solution>

No surface treatment was performed.

<Heat Treatment>

A heat treatment was then performed at 260° C. for 10 hours.

<Measurement>

The resulting heat-treated product was measured in the same manner as Example 1. The results are shown in Table 1.

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| <Rubber Formulation> | | | | (Parts by Weight) | | | | |
| FKM Polymer (Viton A500) | 100 | 100 | 100 | 100 | 100 | 100 | 100 | 100 |
| NT Carbon | 25 | 25 | 25 | 25 | 25 | 25 | 25 | 25 |
| Magnesium Oxide | 3 | 3 | 3 | 3 | 3 | 3 | 3 | 3 |
| Calcium Hydroxide | 3 | 3 | 3 | 3 | 3 | 3 | 3 | 3 |
| Bisphenol AF (CURATIVE #30) | 4.5 | 4.5 | 4.5 | 4.5 | 4.5 | 4.5 | 4.5 | 4.5 |
| Phosphonium Salt (CURATIVE #20) | 9.0 | 9.0 | 9.0 | 1.6 | 1.6 | 1.6 | 9.0 | 1.6 |
| Phosphonium Salt/Bisphenol AF Ratio | 1.3 | 1.3 | 1.3 | 0.2 | 0.2 | 0.2 | 1.3 | 0.2 |
| <Surface Treating Solution Formulation> | | | | (% by weight) | | | | |
| Bisphenol AF (*3) | 10 | 10 | 10 | 10 | 10 | 10 | | |
| Phosphonium Salt (*1) | 2 | 2 | 2 | 2 | 2 | 2 | | |
| Solvent (*2) | 20 | 20 | 20 | 20 | 20 | 20 | | |
| <Surface Treatment Method and Coating Thickness> | | | | | | | | |
| Treatment Method | Spray Coating | Spray Coating | Spray Coating | Spray Coating | Spray Coating | Spray Coating | No Treatment | No Treatment |
| Coating Thickness | 5 μm | 8 μm | 12 μm | 5 μm | 8 μm | 12 μm | | |
| <Rubber Hardness> | | | | | | | | |
| No Surface Treatment (Type-A durometer) | 80 | 80 | 80 | 80 | 80 | 80 | 80 | 80 |
| After Surface Treatment (Type-A durometer) | 84 | 86 | 89 | 83 | 84 | 84 | | |
| <Test Sheet Evaluation> | | | | | | | | |
| Adhesion Increase Rate: Evaluation Method I | 6% | 5% | 5% | 24% | 25% | 25% | 5% | 70% |
| Adhesion Increase Rate: Evaluation Method II | 10% | 8% | 7% | 40% | 39% | 38% | 15% | Not Evaluated |

(*1) Phosphonium salt: benzyltriphenylphosphonium chloride (*2) Solvent: acetone/methanol = 1/3 mixed solvent (*3) Bisphenol AF: "CHENINOX BAF" manufactured by Unimatech, Co., Ltd.

<Evaluation>

It is seen from Table 1 that in Examples 1 to 3, the rubber hardness increased by applying the surface treatment. In addition, as for the tackiness evaluation, the fluororubber products of Examples 1 to 3 had tackiness increase rates of 10% or lower according to both the evaluation methods I and II, and therefore maintained good tack properties.

On the other hand, in Comparative Examples 1 to 3, the rubber hardness increased by applying the surface treatment. Also, it is seen that, because a general fluororubber composition was used in which the weight ratio X of the quarternary phosphonium salt (crosslinking accelerator) to the polyol crosslinking agent (crosslinking accelerator/polyol crosslinking agent) was 0.2 (as effective components), these fluororubber products had tackiness increase rates exceeding 10% according to both the evaluation methods I and II, and failed to exhibit sufficiently reduced tackiness.

Although no surface treatment was applied in Comparative Example 4, the fluororubber product had the same rubber formulation as that of Example 1, and therefore exhibited sufficient non-tack properties according to the evaluation method I for tackiness increase rate. It is seen, however, that the fluororubber product could not exhibit sufficiently reduced tackiness according to the evaluation method II.

As for Comparative Example 5, the fluororubber product could not exhibit sufficiently reduced tackiness even according to the evaluation method I, because no surface treatment was applied, and a general fluororubber composition was used in which the weight ratio X of the quarternary phosphonium salt (crosslinking accelerator) to the polyol crosslinking agent (crosslinking accelerator/polyol crosslinking agent) was 0.2 (as effective components).

Moreover, considering the relationship between the coating thickness and rubber hardness, the following finding was obtained.

The coating thicknesses of the crosslinked fluororubber products of Examples 1 to 3 and Comparative Examples 1 to 3 were increased to 5 μm (number of application: once), 8 μm (number of application: twice), and 12 μm (number of application: three times), respectively. Additionally, crosslinked fluororubber products (each with the same formulation as those of Example 1 and Comparative Example 1, respectively) with a coating thickness of 22 μm (or 21 μm) were prepared by applying the surface treatment solution six times.

Table 2 below shows the relationship between coating thickness and rubber hardness.

TABLE 2

| | (Products of the Invention) | | | | (Comparative Products: General Products) | | |
|---|---|---|---|---|---|---|---|
| Examples | Number of Application | Coating Thickness | Rubber Hardness | Comparative Examples | Number of Application | Coating Thickness | Rubber Hardness |
| | 0 | 0 | 80 | | 0 | 0 | 80 |
| 1 | 1 | 5 | 84 | 1 | 1 | 5 | 83 |
| 2 | 2 | 8 | 86 | 2 | 2 | 8 | 84 |
| 3 | 3 | 12 | 89 | 3 | 3 | 12 | 84 |
| Additional | 6 | 22 | 90 | Additional | 6 | 21 | 85 |

Figure 2:
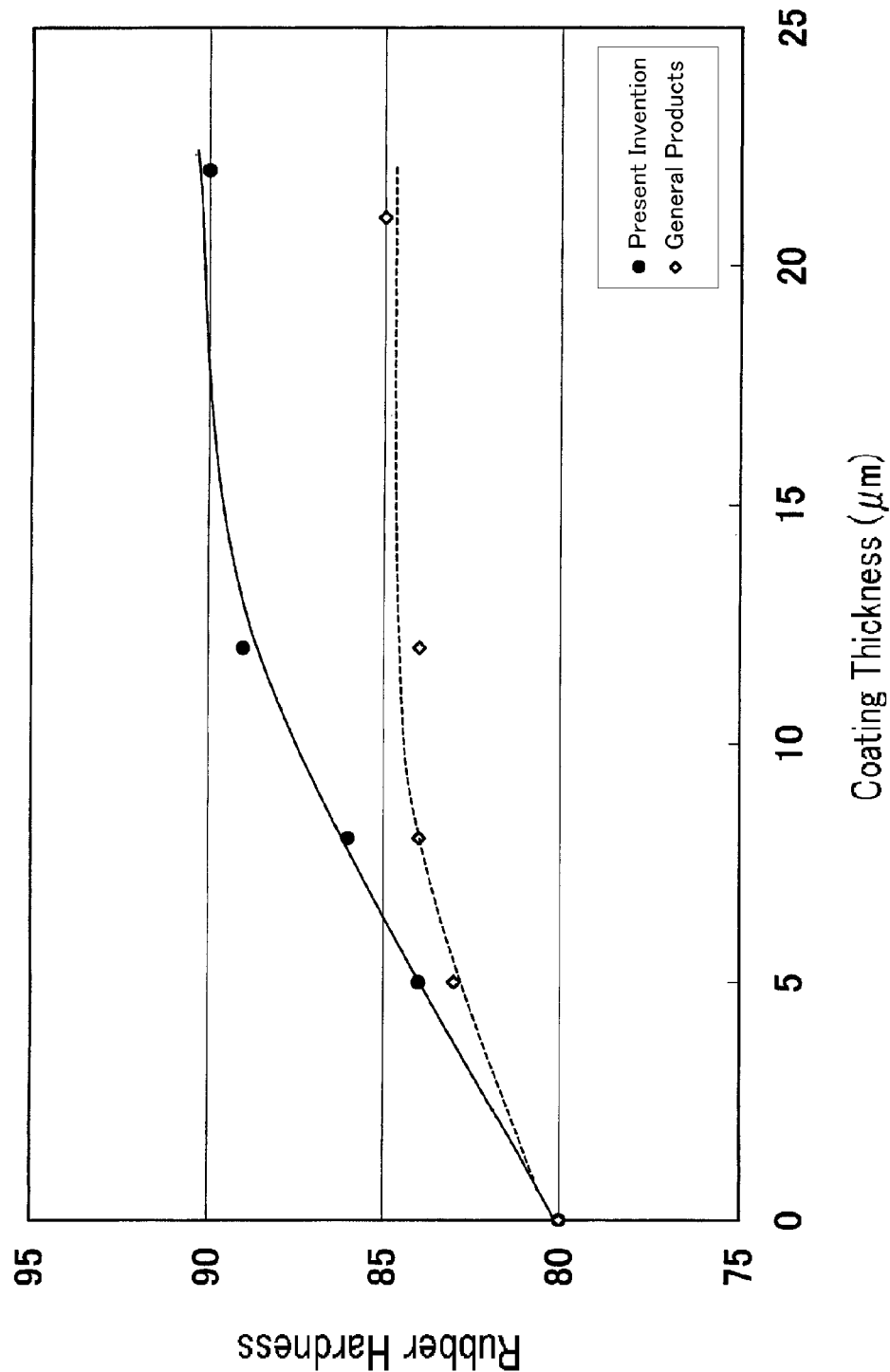
FIG. 2 is a graph showing the relationship between coating thickness and rubber hardness.

FIG. 2 shows the results of Table 2 above in graphs. FIG. 2 shows the results for the products of the invention and general products (comparative products).

As a result, it is seen that in the case of the rubber formulation example of the products of the invention, the hardness increased (crosslinking proceeded) depending on the coating thickness. In contrast, in the case of the comparative products (general products), the hardness changed only slightly. That it to say, even though they have the same coating thickness, for example, 8 μm, the product of Example 2 have a higher hardness than that of the product of Comparative Example 2, i.e., have a higher crosslink density (lower tackiness).

Example 4

Confirmation of Coating Resin Layer

The presence of the coating (resin layer) of the surface treatment solution on the crosslinked fluororubber product obtained in Example 1 was confirmed using a FT-IR (an apparatus used in infrared absorption spectroscopy). The results are shown in FIG. 3 (B).

The surface of the crosslinked fluororubber product obtained in Comparative Example 4 was examined using a FT-IR. The results are shown in FIG. 3 (A).

Figure 3:
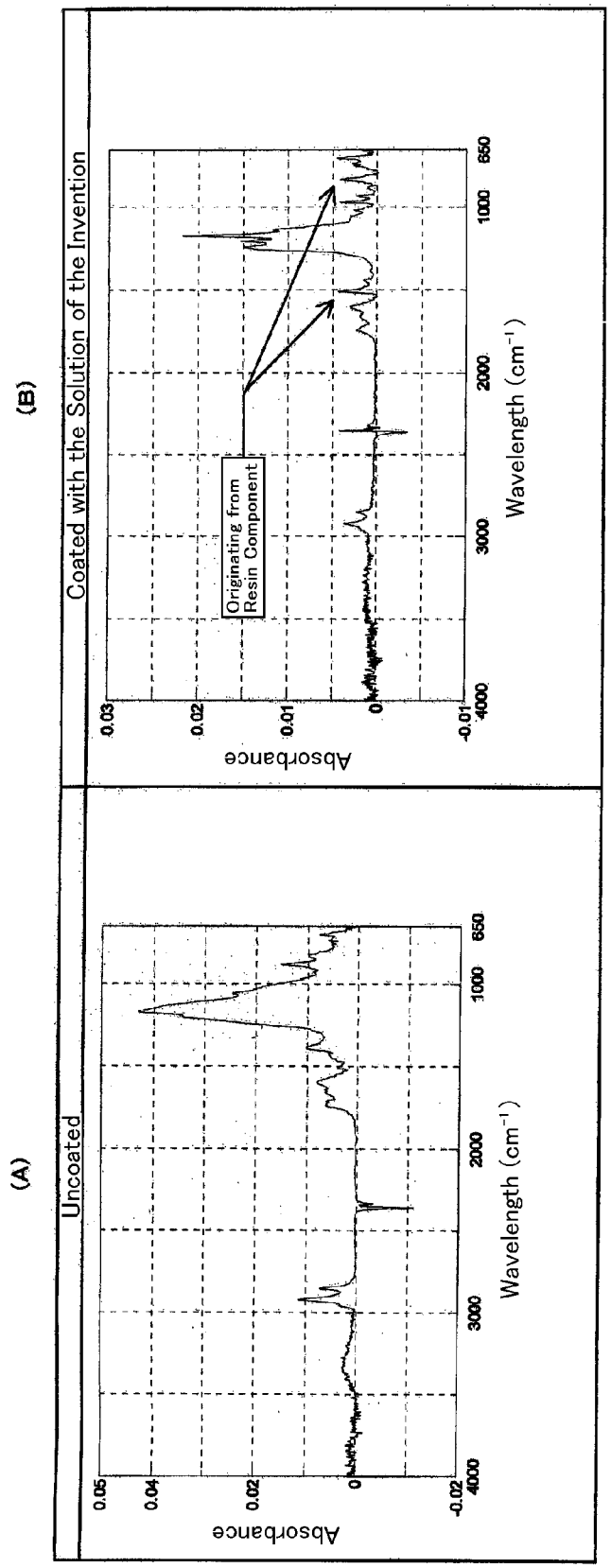
FIG. 3 is a diagram showing graphs obtained using a FT-IR.

As is clear from FIG. 3, the coating resin layer can be observed in the crosslinked fluororubber product of Example 1, while it cannot be observed in the crosslinked fluororubber product of Comparative Example 4.

The presence of the coating (resin layer) of the surface treatment solution on the crosslinked fluororubber product obtained in Comparative Example 1 was confirmed using a FT-IR. The results are shown in FIG. 4 (B).

The surface of the crosslinked fluororubber product obtained in Comparative Example 5 was examined using a FT-IR. The results are shown in FIG. 4 (A).

Figure 4:
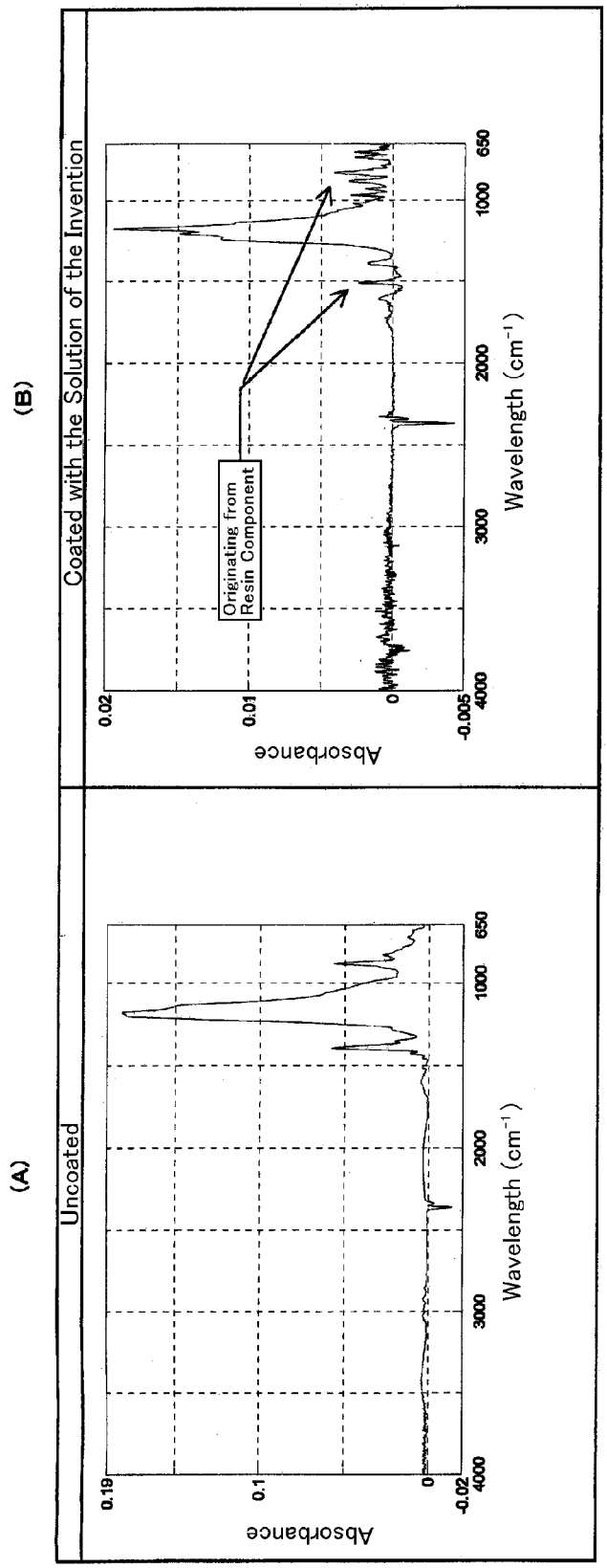
FIG. 4 is a diagram showing graphs obtained using a FT-IR.

As is clear from FIG. 4, the coating resin layer can be observed in the crosslinked fluororubber product of Comparative Example 1, while it cannot be observed in the crosslinked fluororubber product of Comparative Example 5.

[Uses of the Crosslinked Fluororubber Product]

The crosslinked fluororubber product obtained as described above exhibits excellent low tack properties and antistatic properties. It is suitable for use as, in particular, magnet holder-type stoppers and the like in HDD, and is also suitable for use as hard disk drive (HDD) storage heads, storage heads in vehicular disk devices using optical disks and the like, and in storage heads in disk devices for camera incorporated video recorders and the like, shock absorber stopper parts for printer heads and the like; various leakproof rubber parts against fluids (including gases) such as O-rings, packings, V-packings, oil seals, gaskets, square rings, D-rings, diaphragms, and various valves; various rubber parts such as vibration-proof rubbers, belts, rubber coated fabrics, wipers and the like.

The invention claimed is:

1. A method for producing a crosslinked fluororubber product, comprising:
    pressurizing, heating, and vulcanizing a fluororubber composition to mold a vulcanized product;
    the fluororubber composition comprising a polyol-crosslinkable fluororubber, a crosslinking accelerator including a quarternary phosphonium salt, and a polyol crosslinking agent, the weight ratio X of the crosslinking accelerator to the polyol crosslinking agent (crosslinking accelerator/polyol crosslinking agent) being from 0.90 to 3.00;
    applying a treatment solution containing the polyol crosslinking agent and the crosslinking accelerator dissolved in a solvent to a surface of the vulcanized product; and
    heat-treating the resulting vulcanized product at a temperature ranging from 200 to 300° C. until a magnet tackiness increase rate according to an evaluation method II is 10% or lower, wherein in the evaluation method II, a sample rubber sheet with a thickness of 0.4 mm, a length of 3 mm, and a width of 3 mm is placed on a permanent magnet shaped as a square column with a thickness of 3.6 mm, a length of 3 mm, and a width of 3 mm, whose bottom is fixed; a metal rod, made of SPCC, a cold rolled steel plate, with a weight of 30 g, where the shape of the portion contacting the rubber is a 3 mm times 1 mm square rod, is placed on the sample rubber sheet, and an initial tackiness F between the rubber and the metal rod is measured at 23° C. and a humidity of 50%; the metal rod is then placed on the sample rubber again, and a test unit including the magnet, the sample rubber, and metal rod is allowed to stand at 80° C. for 2 hours, and subsequently at 0° C. for 2 hours; the test unit is repeatedly subjected to 20 cycles of being allowed to stand under such a temperature change, and removed from the atmosphere at 0° C. after the final cycle; the tackiness F" is then measured, and using the measured values F, F", the tackiness increase rate (%) is determined in accordance with the following equation:

(Tackiness Increase Rate) =100 times (F"−F)/F.

2. The method for producing a crosslinked fluororubber product according to claim 1, wherein the coating thickness of the treatment solution is in a range of 1 to 15 μm.

3. The method for producing a crosslinked fluororubber product according to claim 1, which produces a polyol-crosslinking, crosslinked fluororubber product for use as a magnet holder-type stopper in an HDD.

* * * * *